Sept. 4, 1934.    O. D. NORTH ET AL    1,972,354
MOUNTING FOR THE STEERING ROAD WHEEL OR WHEELS OF MOTOR VEHICLES
Filed Nov. 7, 1933
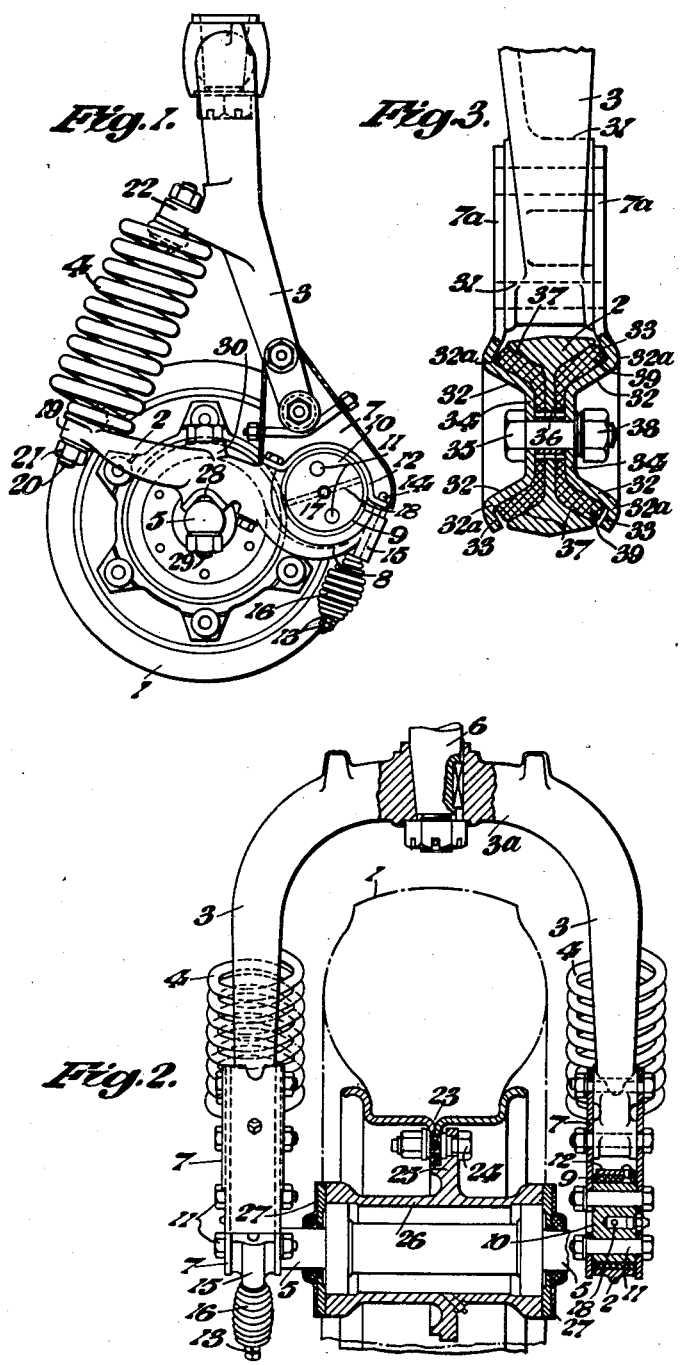
INVENTORS
OLIVER D NORTH
PERCY G HUGH
PER Raynerto
ATTORNEYS Patented Sept. 4, 1934

1,972,354

UNITED STATES PATENT OFFICE 1,972,354

MOUNTING FOR THE STEERING ROAD WHEEL OR WHEELS OF MOTOR VEHICLES

Oliver Danson North and Percy Garibaldi Hugh, London, England, assignors to Scammell Lorries Limited, London, England Application November 7, 1933, Serial No. 696,936
In Great Britain November 10, 1932

8 Claims. (Cl. 208—101)

This invention relates to an improved method of mounting the steering road wheel or wheels of motor vehicles and has for its object to provide a simple and effective method of mounting a steering wheel in a forked steering head so as to provide a form of spring suspension which will absorb road shocks and which will also enable the wheel to be quickly detached or changed when desired. The invention is particularly applicable to three-wheeled motor vehicles in which a single steering wheel is employed mounted in a forked member supported in bearings about which it may turn for steering purposes.

According to this invention an improved mounting for the steering road wheel or wheels of a motor vehicle consists in disposing each wheel axle across a pair of arms, the axle being disposed between the ends of such arms and one end of the arms being oscillatably supported by damping means carried by a steering member and the other end being connected by shock absorbing means to said steering member.

The preferred form of our invention briefly consists in employing a single road steering wheel mounted on an axle readily detachably connected at its ends to the median parts of a pair of arms located either side of the wheel, the arms being pivotally supported at one end by a damping device and at the other end being connected to a compression shock absorbing device, the damping and compression devices being connected to or carried by the limbs of a fork between which the wheel is located, said fork having a central axially rotatable operating member for steering the wheel.

In order that our invention may be clearly understood and readily carried into effect we have appended hereto a sheet of drawing illustrating embodiments thereof and wherein:—

Fig. 1 is a sectional side elevation view showing a mounting for a single or twin steering wheel.

Fig. 2 is a part sectional front elevation view of Fig. 1, and

Fig. 3 is a detail sectional front elevation view of a modified form of damping device.

Referring to the drawing in Figs. 1 and 2 the steering road wheel 1 is secured to a pair of arms 2 pivoted at their forward ends to a forked supporting member 3 and connected at their rear ends by coiled springs 4 to a portion of the forked supporting member 3 so as to permit a limited amount of cushioned oscillation of the arms 2 about their pivotal connection to the ends of the forked supporting member 3. The forked supporting member 3 is suitably mounted in a steering head so that it may be turned about a vertical or nearly vertical axis for steering purposes. The axle of the steering wheel 1 is connected directly to the pivoted arms 2 at a position intermediate between their pivotal connection with the ends of the member 3 and the spring connection between their rear ends and the fork member 3.

The forked supporting member 3 may be a malleable casting, die stamping or sheet metal pressing of the desired form comprising as shown an arched centre part 3a which embraces the upper portion of the steering wheel 1 and the two lower ends of which project downwardly in advance of the axle 5 of the wheel. At the upper end of the forked member is provided a shank 6 adapted to engage in the steering head in which it is supported in any desired manner so that it may be turned about a vertical or nearly vertical axis for steering purposes. This axis is preferably arranged slightly in advance of the centre of the steering wheel.

To the lower ends of the limbs of the forked member 3 are pivotally secured the forward end of each pivoted arm 2 which is clamped between a pair of plates 7 mounted upon opposite sides of each fork end. The pivotal end of each arm 2 is provided with a semi-circular recess 8 to receive a friction lining 9 disposed about a cylindrical centre block 10 secured by bolts 11 between the appropriate pair of plates 7, a clamping band 12 embracing the upper part of the bushing 9 and being adjustable in its pressure by nuts 13 threaded on to a stud 14 one such stud being passed through one end of each band 12 and a guide bushing 15 on the end of the appropriate arm 2 and a coiled compression spring 16 being interposed between the guide bushing 15 and nuts 13 to produce resiliency in the pressure on the band 9. A central lubricating passage 17 communicates by radial passages 18 with the friction ring or bushing 9. This arrangement permits the pivoted arms 2 to oscillate to a limited extent about the pivotal axis within the damping device formed by the clamping bands 12. This form of mounting enables heavy loads to be supported and enables road shocks to be absorbed without excessive movement of the wheel or springs.

The rear ends of the pivoted arms 2 are provided with bosses 19 against which one end of the stout coil spring 4 is firmly clamped by means of a clamping bolt 20 passed through the boss and secured by a suitable nut or nuts 21 and so arranged as to clamp the end of the spring firmly on the boss. The other end of each spring is similarly secured to a rearwardly directed seating 22 formed at each side of the forked member 3 so that the springs are permanently anchored at one end to the forked member and at the other end to the rear end of the pivoted arms.

The steering wheel 1 comprises a suitable rim for the reception of a pneumatic or other tyre. The rim may if desired be split circumferentially as indicated at 23 in Fig. 2 and clamped by bolts 24 to a flange 25 on the wheel hub 26. The wheel hub 26 is mounted on a suitable axle 5 by suitable ball, roller or other anti-friction bearings of a suitable size and capacity to deal effectively with both radial and lateral loads. The two ends of the axle 5 project beyond cover plates 27 on the hub and are adapted to be clamped directly to the pivoted arms 2 at a suitable position intermediate between their forward pivotal ends and the rear ends which are attached to the coil springs 4. For this purpose the hinged arms may be provided with transverse recesses 28 preferably on their undersides in which the projecting ends of the wheel axles engage. These recesses may as shown be substantially V shape in form and if desired the axle may be correspondingly shaped to engage in the recesses. A suitable bolt 29 is passed directly through the axle 5 and through a boss 30 on each of the hinged arms so as to clamp the axle in position in the recesses on the pivoted arms, this enabling the steering wheel to be easily removed and re-affixed. Any other desired method of clamping the axle to the pivoted arms may be employed, the chief requirement being that the axle shall be rigidly secured thereto so as to obviate any risk of movement or looseness whilst at the same time permitting it to be quickly and easily detached for removal of a wheel and as quickly secured in position for replacement.

In the alternative method of securing the front end of each arm 2 shown in Fig. 3 the front end of each said arm is clamped between two plates 7a, 7a, bolted to the forked member 3 which is formed with apertured bosses 31 to receive the bolts. The lower ends of these side plates 7a are pressed into symmetrical inwardly directed truncated cones 32, the rims 32a of which preferably protrude beyond the outer planes of the plates 7a as shown to provide outer substantially annular flange like or abutments surfaces 33. The concentric central parts 34 of these conical parts are apertured to receive a bolt 35 which passes with a clearance through an aperture 36 in the arm 2 which is flanged symmetrically outwards at both sides into conical seatings 37 between which and the cones 32 of the plates 7a are gripped, by threading a nut 38 on the bolt 35, a pair of rubber, leather or other suitable frictional damping members 39 of cupper configuration. Such an arrangement provides a large area of contact of the compressible friction members 39 and the plates 7a and arms 2.

We claim:—

1. In a steering wheel mounting for a motor road vehicle, a wheel axle, a pair of side by side arms across which said axle is located and secured between the ends of such arms, damping means oscillatably supporting one end of said arms, a steering member carrying said damping means, and shock absorbing means connecting the other end of said pair of arms to said steering member.

2. A steering wheel mounting for a motor road vehicle comprising a steering wheel, a single axle carrying said wheel, a pair of side by side arms disposed transversely relatively to said axle and receiving at their median parts the ends of said axle, a substantially vertical axis steering member, a fork at the lower end of said steering member receiving between its limbs the said wheel, torsional damping devices carried by said limbs oscillatably supporting one end of said pair of arms, and compression springs connecting the other end of said arms to said limbs above said axle.

3. A steering wheel mounting for a motor road vehicle comprising a steering wheel, a single axle carrying said wheel, a pair of side by side arms disposed transversely relatively to said axle and receiving at their median parts the ends of said axle, a substantially vertical axis steering member, a fork at the lower end of said steering member receiving between its limbs the said wheel, torsional damping devices carried by said limbs oscillatably supporting one end of said pair of arms, compression springs connecting the other end of said arms to said limbs above said axle, recesses in the lower edges of said arms in which the ends of said axle engage, and bolts securing the axle to the arms.

4. A steering wheel mounting for a motor road vehicle comprising a steering wheel, a single axle carrying said wheel, a pair of side by side arms disposed transversely relatively to said axle and receiving at their median parts the ends of said axle, a substantially vertical axis steering member, a fork at the lower end of said steering member receiving between its limbs the said wheel, torsional damping devices carried by said limbs oscillatably supporting one end of said pair of arms, compression springs connecting the other end of said arms to said limbs above said axle, recesses in the lower edges of said arms receiving the ends of said axle, bolts passed substantially vertically through said axle and said arms, said springs pressing said arm downward upon said axle.

5. In a steering wheel mounting for a motor road vehicle, a wheel axle, a pair of side by side arms across which said axle is located and secured between the ends of such arms, damping means oscillatably supporting one end of said arms, a steering member carrying said damping means, shock absorbing means connecting the other end of said pair of arms to said steering member, said damping means comprising a friction band, and a cylindrical member about which said band is gripped.

6. A steering wheel mounting for a motor road vehicle comprising a steering wheel, a single axle carrying said wheel, a pair of side by side arms disposed transversely relatively to said axle and receiving at their median parts the ends of said axle, a substantially vertical axis steering member, a fork at the lower end of said steering member receiving between its limbs the said wheel, torsional damping devices carried by said limbs oscillatably supporting one end of said pair of arms, compression springs connecting the other end of said arms to said limbs above said axle, said damping devices comprising a pair of cylindrical bodies, two pairs of plates, each pair receiving one of said cylindrical bodies between them and being connected one pair to one limb of the said fork and the other pair to the other limb of the fork, friction bands disposed about said cylindrical bodies, and recesses at one end of said pair of arms receiving said friction bands.

7. In a steering wheel mounting for a motor road vehicle a forked steering member adapted to be rotated about a substantially vertical axis, a road engaging wheel between the two limbs of said forked member, a side by side pair of longitudinal arms, an axle for said arms secured across substantially the median parts of said arms, compression springs connected across one end of said arms and said forked member above the axle, a pair of cylindrical bodies, two pairs of plates, each pair receiving one of said cylindrical bodies between them and being connected one pair to one limb of the said fork and the other pair to the other limb of the fork, friction bands disposed about said cylindrical bodies, and recesses at one end of said pair of arms receiving said friction bands.

8. In a steering wheel mounting for a motor road vehicle a forked steering member adapted to be rotated about a substantially vertical axis, a road engaging wheel between the two limbs of said forked member, a side by side pair of longitudinal arms, an axle for said arms secured across substantially the median parts of said arms, lateral projections formed on the limbs of said forked steering member between their ends, compression springs interposed between said projections and the front ends of said arms, a pair of cylindrical bodies, two pairs of plates, each pair receiving one of said cylindrical bodies between them and being connected one pair to one limb of the said fork and the other pair to the other limb of the fork, friction bands disposed about said cylindrical bodies, and recesses at one end of said pair of arms receiving said friction bands.

OLIVER DANSON NORTH.
PERCY GARIBALDI HUGH.